United States Patent [19]

Freymuth

[11] Patent Number: 4,636,711

[45] Date of Patent: Jan. 13, 1987

[54] PULSE WIDTH MODULATION CONTROL CIRCUIT WITH A VARIABLE ZERO TO ONE HUNDRED PERCENT DUTY CYCLE

[75] Inventor: William P. Freymuth, Tulsa, Okla.

[73] Assignee: Airborne Electronics, Inc., Plano, Tex.

[21] Appl. No.: 838,426

[22] Filed: Mar. 7, 1986

Related U.S. Application Data

[63] Continuation of Ser. No. 677,754, Dec. 4, 1984, abandoned.

[51] Int. Cl.[4] .............................................. G05F 1/56
[52] U.S. Cl. ..................................... 323/282; 318/139
[58] Field of Search ....................... 323/282, 284, 288; 318/139

[56] References Cited

U.S. PATENT DOCUMENTS 4,309,645  1/1982  De Villeneuve ................... 318/139

Primary Examiner—Patrick R. Salce
Assistant Examiner—Anita M. Ault
Attorney, Agent, or Firm—Sigalos & Levine

[57] ABSTRACT

This invention forms a basic circuit for the input to a voltage control device for an inductive load. It consists of a basic constant frequency oscillator comprising a Schmitt trigger and inverter having an input with a capacitor to ground and an output which feeds back to the input to one end of a potentiometer or feeds forward from the other end of that potentiometer to the output. A point in between the ends of the potentiometer is connected to the input to the Schmitt trigger. If the input potential of the Schmitt trigger is low its output will be high and vice versa. If its input is low, current flows from the output through a diode to the potentiometer and to the capacitor to ground and if it is high, current flows from the capacitor through the potentiometer and a diode to the output of the Schmitt trigger. Thus, a clean square wave pulse current is provided of variable width pulse ratio dependent upon the setting of the contact between the input to the Schmitt trigger and a point on the potentiometer.

There is a second part which has to do with expanding the duty cycle of the pulse width modulation from zero to one hundred percent by passing the output of the Schmitt trigger and inverter to a low pass (high cut) filter and to a buffer and to an electronic switch means to control the current through the load.

12 Claims, 6 Drawing Figures

PULSE WIDTH MODULATION CONTROL CIRCUIT WITH A VARIABLE ZERO TO ONE HUNDRED PERCENT DUTY CYCLE

This application is a continuation of application Ser. No. 677,754, filed Dec. 4, 1984, now abandoned.

CROSS-REFERENCE TO RELATED APPLICATIONS

This application is one of a group of three applications, all filed on the same date in the United States Patent and Trademark Office. Each of these separate applications covers one of several different inventions which can be used together in a preferred system or which can be used separately with other types of control apparatus. For example;

Ser. No. 838,426, "A Pulse Width Modulation Control Circuit with a Variable Zero to One Hundred Per Cent Duty Cycle", concerns a variable Pulse Width Modulated apparatus for controlling the average current through a load from zero to one hundred percent. It can be used with a variety of driver circuits driving electronic switches to control the average current and, thus, power through a load.

Ser. No. 838,425, "A voltage Clamp Circuit for Switched Inductive Loads", covers a circuit means for clamping the voltage generated when a load current is cut off by an electronic switch and an inductive voltage is generated trying to maintain the current through the load and the switch, means are provided for limiting this inductive voltage and for using it to momentarily turn the electronic switch back on in order to pass the inductive current which represents the energy still in the load.

Ser. No. 838,424, "A Free Wheeling Diode Control Circuit for Motor Speed Control with Reverse Voltage Protection", describes a system where the speed of a motor is controlled by a switch means and a free wheeling diode. In such a system, the switch means may, also, have an integral reverse diode, i.e., a Power MOSFET or Darlington Power Transistor. Without proper protection, such a system would present a short circuit with reverse polarity. This invention describes a method to protect against this condition.

This application is Ser. No. 838,426.

BACKGROUND OF THE INVENTION

This invention lies in the field of Pulse Width Modulation (PWM) control circuits. More particularly, it concerns a PWM control circuit which can provide a continuously variable zero to one hundred percent duty cycle. Still more particularly, it is a controlled system that can be used to control or vary the average current and, thus, the power applied to a load.

The prior art of this type of invention is rather voluminous, but it does not include a variable duty cycle of zero to one hundred percent as does this invention. In addition, this invention utilizes a simpler and less expensive circuit.

SUMMARY OF THE INVENTION

Before explaining in detail the present invention, it is to be understood that the invention is not limited in its application to details of the construction and arrangement of parts illustrated in the accompanying drawings. The invention is capable of other embodiments and of being practiced or carried out in a variety of ways. It is to be understood that the phraseology and terminology employed herein is for the purpose of description and not of limitation.

It is the primary object of this invention to provide a PWM control circuit having a continuously variable zero to one hundred percent duty cycle. These and other objects are realized and the limitations of the prior art are overcome in this invention by providing an oscillator utilizing a Schmitt trigger logic circuit with an inverted output, with means to provide different time constants to the oscillator for each half cycle of the output and with the sum of the two half cycles always equal to a constant period of oscillation. Thus, one half cycle can be long and the other short and vice versa. The control of the oscillator frequency is by resistance. The resistance is varied by use of a potentiometer with diodes on each end tied to the output of the Schmitt trigger and the wiper of the potentiometer connected to the capacitor and the input to the Schmitt trigger. This comprises the Basic PWM circuit.

The output of the Basic PWM circuit is used to drive a Buffer through a series resistor and shunt capacitance to ground on the input to the Buffer. The purpose of this stage is to provide a filter for very short positive or negative pulses to the Buffer from the Basic PWM circuit so that when one or the other half cycles of the Basic PWM circuit is very short the change in voltage of the output is not carried to the output of the Buffer but is filtered out by the series resistor and the shunt capacitance. The output of the Buffer, then, is the Basic PWM signal with a variable zero to one hundred percent duty cycle.

BRIEF DESCRIPTION OF THE DRAWINGS

These and other objects and advantages of this invention and a better understanding of the principles and details of the invention will be evident from the following description taken in conjunction with the appended drawings, in which:

Referring now to FIG. 1, it will be seen that this schematic drawing is essentially identical to FIG. 1 of each of the other two applications of this group of three applications. The three inventions taken together fit into a general pulse width modulation control system, each one improving an important part of the entire circuit.

There are conventional ways of doing most of the things that are covered by these inventions, although the way they do them are not statisfactory and are more costly and perhaps dangerous. Each of the three inventions will be emphasized in a different one of the three applications, but in one application the part that is being emphasized will be described in detail as the invention and claims, while the rest of the circuit will not be discussed in as great detail because it will be understood that the invention of that application is being used with more or less conventional apparatus and will improve the operation of the system but not as well as if all three inventions were combined in the same system.

Thus, in Ser. No. 838,426, dark outlined boxes 10 and 40 comprise a first invention which are discussed in that application. In another application the box 70 contains the novel and improved portion of the invention and will be fully described, although the rest of the circuit will be described in simple terms as being of conventional design since conventional means of doing each one of these parts of the circuit can be done, but not with the improvement of these inventions. In a third application the box 80 will be described as the inventive portion and the rest of the circuit including the boxes 10, 40 and 70 will be shown, although it can be stated that conventional methods of handling those particular portions of the circuit would operate with the inventive portion of that circuit.

Figure 1:
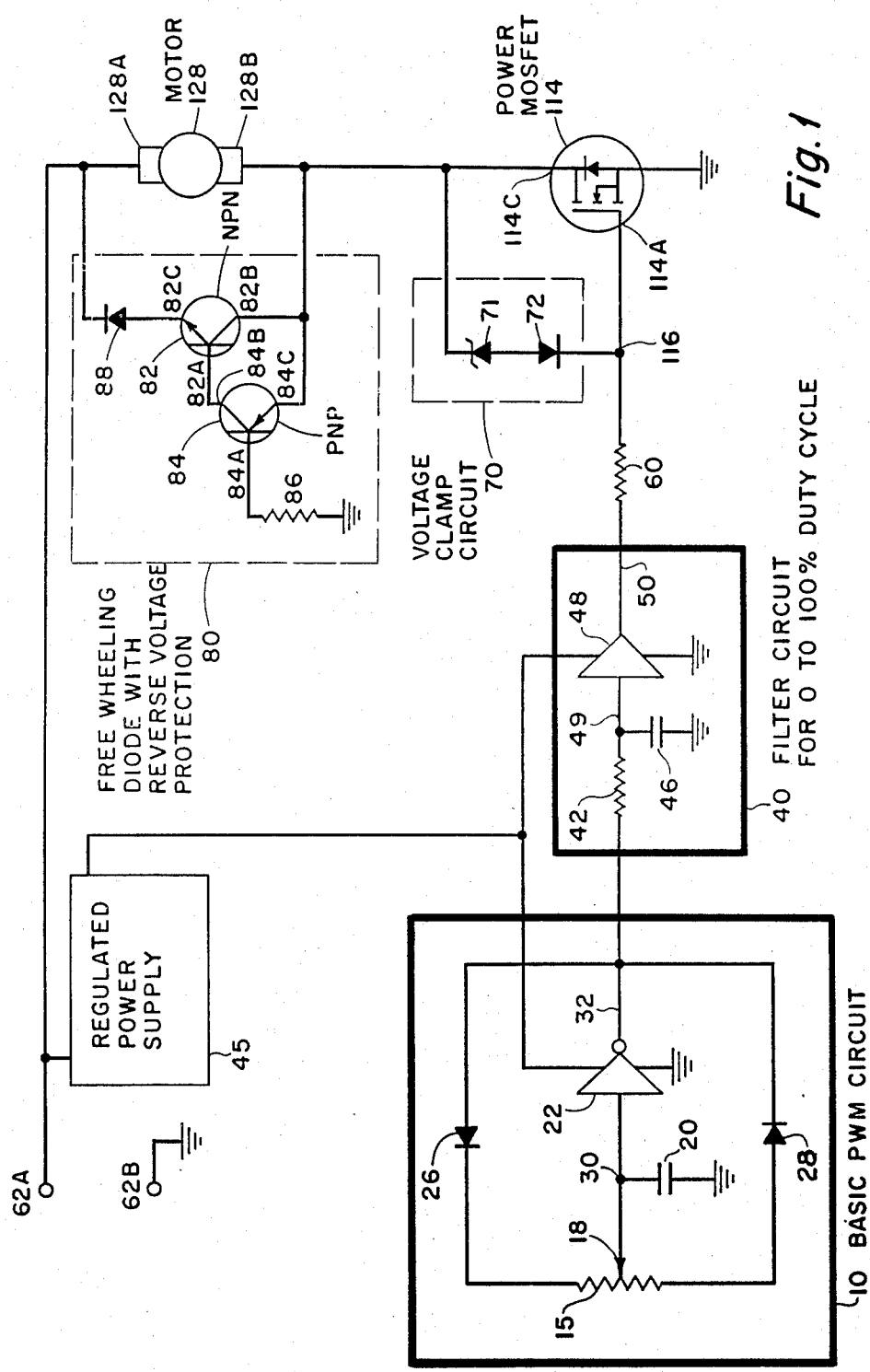
FIG. 1 is a schematic diagram of a complete PWM control circuit with means to provide a variable zero to one hundred percent duty cycle.

Referring now to the drawings, there is shown in FIG. 1 a schematic diagram of a complete operating circuit including an electric motor load 128 the speed of which is controlled by the PWM control circuit with a variable zero to one hundred percent duty cycle.

While the basic circuit 10 is shown followed by a box 40, the purpose of which is to broaden the range of duty cycle to 0-100%, may not be required. In other words if the control of the load that is required would permit a duty cycle, say, from 5% to 95% the output 32 of the box 10 can drive directly the line 50, and the box 40 would not be used. Of course, if the load was large and a number of electronic switches were used in parallel, some sort of buffer or drive circuit might be required. The importance of the box 40 is to broaden the duty cycle to from 0 to 100%, if required.

DESCRIPTION OF THE PREFERRED EMBODIMENTS

Figure 1E:
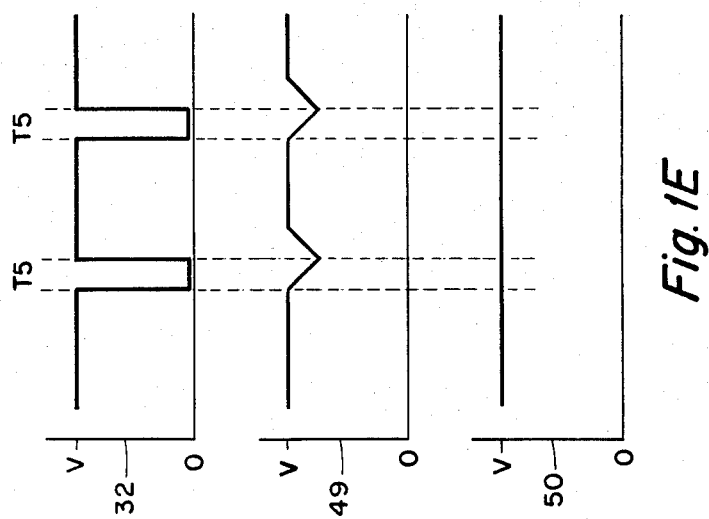
FIGS. 1A, 1B, 1C, 1D and 1E are additional views of portions of the circuit of FIG. 1 to illustrate the details of operation.

Numeral 10 is used to indicate generally the Basic PWM circuit. FIG. 1A illustrates a simple Schmitt trigger oscillator corresponding to the portion of FIG. 1 illustrated generally by the numeral 10. The Schmitt trigger 22 is conventional except that it has a negative or inverted output from the input, and receives power from the Regulated Power Supply 45 of FIG. 1. In FIG. 1A, the output at 32 is connected through a resistor R to the input 30 of the Schmitt trigger. A capacitor 20 of selected size is connected between 30 and ground.

Figure 1B:
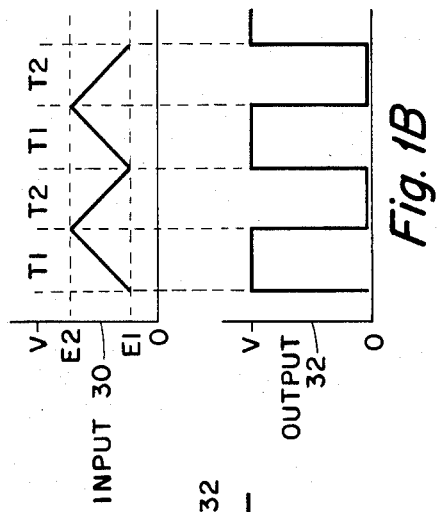
Figure 1D:
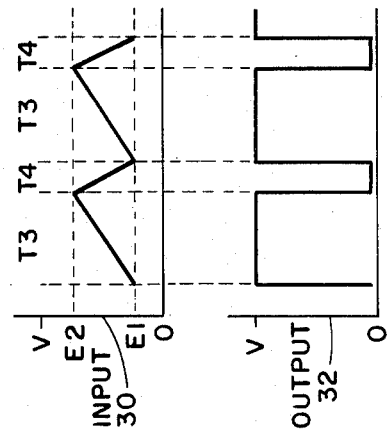
Figure 1A:
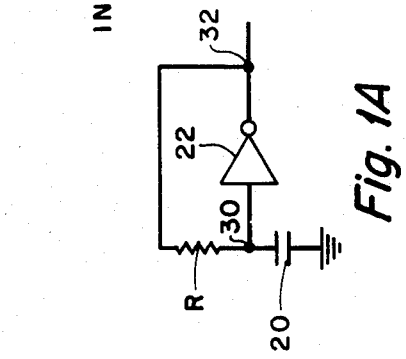

Referring to FIG. 1B, the operation of the Schmitt trigger oscillator of FIG. 1A is such that when the input 30 voltage goes higher than a selected voltage E2, the output 32 will become low, and when the input goes lower than a selected voltage E1, the output 32 will become high. This is illustrated by the sawtooth voltage T1, T2 etc. Since the time constant of the circuit between the output and the input of the Schmitt trigger has a constant resistance R and capacitance 20, the oscillator will operate under a constant frequency or period based on the time required to charge and discharge the capacitor and, thus, the input voltage between E1 and E2. In other words, the output 32 of the Schmitt trigger 22 will be the output 32 square wave of FIG. 1B. The output wave at 32 will show a pulse modulation in which the pulses and lack of pulses are equal in time duration.

Figure 1C:
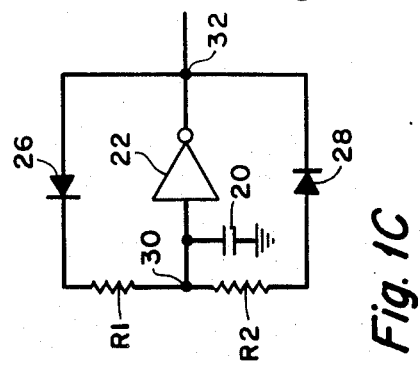

To get an uneven modulation, that is, one that is not 50% on and 50% off, one must change the resistance R in the feedback circuit of the Schmitt trigger when the input capacitor is being charged, as compared to when the input capacitor is being discharged. Referring to FIG. 1C, two resistors (R1 and R2) are used with corresponding diodes 26 and 28 so that when the output voltage of the Schmitt trigger 22 is high, current will flow through diode 26, through R1 to the point 30 at the input of the Schmitt trigger charging the input up to the voltage E2 as shown in FIG. 1D. When the input voltage reaches E2, the output of the Schmitt trigger 22 will change, and the output at point 32 will go low. Current will then flow back from 30 through resistor R2, through the diode 28 to point 32, discharging capicitor 20 to voltage E1. In FIG. 1, instead of having two separate resistors (R1 and R2), a potentiometer 15 is used and a slider 18 changes the ratio of the resistance R1 and R2. Thus, a 50% duty cycle would look like FIG. 1B, whereas a longer duty cycle would look like FIG. 1D, where the high output at 32 extends through a larger portion of the cycle and a low output to a smaller portion of the cycle corresponding to T3 and T4, respectively. Thus, by adjusting the slider to any position, even to the ends of the potentiometer, a duty cycle from nearly zero to nearly one hundred percent can be provided by this circuit of FIG. 1. In addition, the sum of the charge time plus the discharge time is always equal to a constant, thus, providing a constant period of oscillation for the Basic PWM circuit.

What has been described so far is just the portion indicated in general by numeral 10, which is outlined in heavy line box, in FIG. 1, which is the Basic PWM circuit. The portion that controls the ability to go from zero to one hundred percent is the filter circuit, in general indicated by, heavy line box 40 of FIG. 1. It consists of the series resistor 42 and the shunt capacitance 46 all connected to the input 49 of Buffer 48. Referring now to FIG. 1 and the waveforms in FIG. 1E, the first waveform 32 is the input to the resistor 42 on line 32, waveform 49 is the input to the Buffer 48 and waveform 50 is the output of Buffer 48. The action is that as the output 32 of the basic PWM circuit passes through the filter, the high frequencies are filtered as shown by waveform 49 depending on the ratio of resistance 42 and capacitance 46 so that very short time periods, T5, in which the voltages are either low or high can be filtered out before the Buffer 48, the output of which is shown by 50. The Buffer 48 receives power from the Regulated Power Supply 45 of FIG. 1.

The output of the Buffer 48 goes by line 50 through resistor 60 to the gate 114A of Power MOSFET Switch 114 which controls the current passing through a motor load 128 supplied with DC power from the input 62A. Power is supplied to the system with the positive input at 62A and the negative input at 62B which is connected to the system ground.

The box 45 is used to indicate any conventional Regulated Power Supply which is necessary to have clean, no noise circuits for the control electronics.

The box 80 is used to indicate one possible type of Free Wheeling Diode With Reverse Voltage Protection.

The box 70 is used to indicate one possible type of Voltage Clamp Circuit.

It will be clear that the portion of the circuit from the Basic PWM circuit 10 through the Filter Circuit 40 to the voltage on line 50 comprises the invention. What follows, that is, the particular switch circuit, the particular load and the particular switching means can be varied. However, the voltage at 50 will be useful to control a wide variety of loads for various types of drivers and switches.

While FIG. 1 shows an electric motor 128 and a MOSFET type of control switch 114, this is by way of illustration and not by way of limitation. Other types of loads and other kinds of switch means can be provided, such as a power transistor or a Silicon Controlled Rectifier (SCR) or the like. Also, depending on the type of switch used, a driver circuit may be required to amplify the control signal 50 in order to drive the switch means.

While I speak of a "Schmitt Trigger", and inverter, I mean any gate or buffer means which has a characteristic such that when the input potential falls below a selected voltage, the output voltage goes high, and vise versa.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. In an apparatus for controlling the average current through a load means by means of a pulse width modulated signal to an electronic switch means in series with said load means;
the improvement in constant period oscillator and pulse width modulator comprising:
   (a) a source of selected voltage;
   (b) Schmitt trigger and inverter (STAI) means;
   (c) resistance means with a first of its two ends connected to the output of said STAI through a first diode, having its anode connected to said output; the second of said two ends connected to said output through a second diode, having its cathode connected to said output;
   (d) an intermediate point between said two ends connected to the input of said STAI; and a first capacitor connected between said input and ground.

2. The apparatus as in claim 1 and including;
   (e) means connecting said output of said STAI to a driver means, connected to electronic switch means, and connected to said load means.

3. The apparatus as in claim 1 in which said means connecting said output of said STAI comprises;
   (f) said output of said STAI connected through a first series resistor, to the input of a Buffer means;
   (g) a second capacitor connected between said input of said Buffer and ground;
   (h) the output of said Buffer connected to said electronic switch means;
   whereby said first series resistance and said second capacitance comprise a filter means which permits said first Buffer to provide a PWM control circuit with a variable zero to one hundred percent duty cycle.

4. The apparatus as in claim 3 and including;
   (i) the output of said first Buffer connected to a driver means, to an electronic switch means, and to a load means.

5. The apparatus as in claim 1 in which said resistance means comprises a potentiometer means, with said intermediate point being the point of contact of the slider of said potentiometer.

6. In an apparatus for controlling the average current through a load means by means of a pulse-width modulated (PWM) signal to an electronic switch means in series with said load means and wherein said PWM signal has a range of less than zero to one hundred percent, the improvement comprising; means to widen said load cycle to from zero percent to one hundred percent wherein said source of PWM signals comprises:
   (a) a source of selected voltage;
   (b) Schmitt trigger and inverter (STAI) means;
   (c) resistance means with a first of its two ends connected to the output of said STAI through a first diode, having its anode connected to said output; the second of said two end connected to said ouput through a second diode, having its cathode connected to said output;
   (d) an intermediate point between said two ends connected to the input of said STAI; and a first capacitor connected between said input and ground, and wherein said means to widen load cycle further comprises:
   (e) buffer means between said PWM signal generator and a signal driver means; and
   (f) low pass (high cut) filter means inserted between said PWM signal generator and said buffer means.

7. The apparatus as in claim 6 in which said low pass (high cut) filter means comprises;
   (a) series resistor in the lead to said Buffer; and
   (b) shunt capacitance means from the input to said Buffer and ground.

8. In a control system for controlling an apparatus, which is responsive to a pulse width modulated signal the improvement in constant period oscillator and pulse width modulator comprising:
   (a) a source of selected voltage;
   (b) Schmitt trigger and inverter (STAI) means;
   (c) resistance means with a first of its two ends connected to the output of said STAI through a first diode, having its anode connected to said output; the second of said two ends connected to said output through a second diode, having its cathode connected to said output;
   (d) an intermediate point between said two ends connected to the input of said STAI; and a first capacitor connected between said input and ground; and
   (e) means to connect the output of said STAI to said apparatus.

9. The control system as in claim 8 in which said apparatus comprises; an inductive load means in series with an electronic switch means; said series combination of load and switch means connected across a source of electric voltage.

10. Apparatus for generating output pulses of variable width duty cycle comprising:
    (a) a Schmidt trigger circuit having a sawtooth input and a inverted square wave output pulse with one-half becoming increasingly positive and one-half becoming increasingly less positive,
    (b) a first variable time constant charging circuit coupling said increasingly positive one-half of said inverted output of said Schmidt trigger to said input for providing a linearly increasing input voltage whose slope varies with the time constant of said charging circuit, and
    (c) a second variable time constant discharging circuit coupling the other one-half of said inverted output of said Schmidt trigger to said input for providing a linearly descreasing input voltage whose slope varies with the time constant of said discharging circuit thereby providing a square wave output pulse whose duty cycle varies with said first and second time constant circuits.

11. Apparatus as in claim 10 wherein said first variable time constant charging circuit comprises:

(a) a first diode having its input coupled to said Schmidt trigger output,
(b) a first variable resistor and series coupled capacitor connected between said diode and ground potential, and
(c) means coupling the junction of said series coupled variable resisitor and capacitor to said input of said Schmidt trigger to provide a linearly increasing input voltage whose slope varies with the time constant of said charging circuit.

12. Apparatus as in claim 11 wherein said second variable time constant discharging circuit comprises:
(a) a second variable resistor having one end coupled to the junction of said series coupled first variable resistor and capacitor, and
(b) a second diode having its input coupled to the other end of said second variable resistor and its output coupled to said output of said Schmidt trigger to provide a linearly decreasing input voltage to said Schmidt trigger whose slope varies with the time constant of said second variable resistor and said capacitor.

* * * * *